(No Model.)
J. P. LAVIGNE.
COMBINED PRESSER FOOT AND ATTACHMENT HOLDER.
No. 359,452. Patented Mar. 15, 1887.
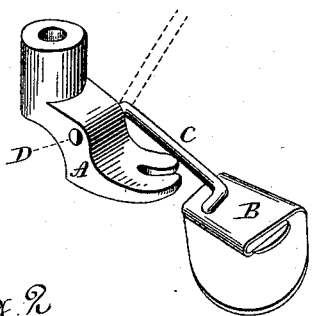
Fig. 1
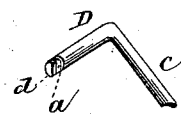
Fig. 2
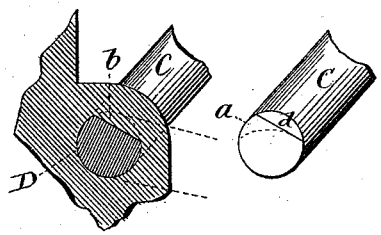  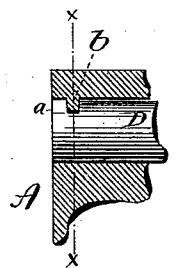 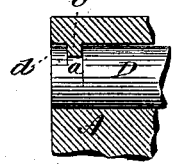
Fig. 3.  Fig. 4.  Fig. 5.  Fig. 6.
Witnesses.
J. H. Shumway
Fred C. Earle
Jos. P. Lavigne,
Inventor,
By Atty.

UNITED STATES PATENT OFFICE.

JOSEPH P. LAVIGNE, OF NEW HAVEN, CONNECTICUT, ASSIGNOR TO JANE HALLIWELL, OF SAME PLACE.

COMBINED PRESSER-FOOT AND ATTACHMENT-HOLDER.

SPECIFICATION forming part of Letters Patent No. 359,452, dated March 15, 1887.

Application filed March 9, 1886. Serial No. 194,582. (No model.)

*To all whom it may concern:*

Be it known that I, JOSEPH P. LAVIGNE, of New Haven, in the county of New Haven and State of Connecticut, have invented a new Improvement in Sewing-Machine Attachments; and I do hereby declare the following, when taken in connection with accompanying drawings and the letters of reference marked thereon, to be a full, clear, and exact description of the same, and which said drawings constitute part of this specification, and represent, in—

Figure 1, a perspective view of a presser-foot, showing an attachment hung thereto; Fig. 2, a perspective view of a portion of the arm and the lateral projection therefrom; Fig. 3, a transverse section through the presser-foot, cutting through the lug; Fig. 4, an end view of the pivot or lateral projection D, looking toward the arm C; Fig. 5, a longitudinal section through the presser-foot, cutting through the lug, and showing the projection D as introduced preparatory to locking; Fig. 6, the same, showing the projection as locked.

This invention relates to an improvement in applying attachments to sewing - machines—such as hemmers, fellers, binders, &c.—the object of the invention being a simple and convenient device, whereby the attachment may be readily applied or removed, and at the same time be adapted to be turned up from the work-plate for the introduction of the work, and then returned into the proper plane with relation to the presser - foot; and the invention consists in providing the attachment with an arm extending rearward therefrom toward the presser-foot, the said arm constructed with a right-angular bend of cylindrical shape, and the presser-foot with a transverse recess corresponding to the said cylindrical right-angular portion of the arm, and into which the said cylindrical portion of the arm is adapted to be introduced from one side of the presser-foot, and so that the attachment may be turned up or down, the said cylindrical portion turning in the presser-foot as the pivot, the presser-foot constructed with a projection inside the recess, and the cylindrical portion of the arm with a corresponding notch, adapted to engage the projection in the recess when the attachment is turned downward, but so as to escape therefrom when in the up position, and as more fully hereinafter described.

A represents the presser-foot, of common construction; B, a hemmer, also of common construction, but it will be understood that any similar attachment may be employed.

From the attachment an arm, C, extends rearward, and to which the attachment is made fast. At the rear end the arm C is turned at right angles, and in a horizontal plane, to form a lateral projection, D. This right-angular portion D is of cylindrical shape, and at one point is constructed with a notch, *a*, cut in its surface.

Transversely through the presser-foot is an opening corresponding to the cylindrical angular projection D of the arm, and in the opening through the presser-foot is a projection or lug, *b*, corresponding to the notch *a* in the projection D of the attachment-arm, and so that the projection D, being introduced through the recess in the presser-foot from one side, with the attachment turned upward, as indicated in broken lines, Fig. 1, and as also indicated in Fig. 3, the projection D may be introduced through the opening in the presser-foot, it being cut away from the line of the notch outward, as at *d*, Fig. 5, so as to pass the lug *b* when in the up position, and until the notch in the projection D is brought into the plane of the lug *b*. Then the attachment is turned downward, as indicated in Fig. 1, and so as to bring the notch onto the lug, as seen in Fig. 6, the notch and lug interlocking, so as to hold the attachment from transverse movement, but leaving it free to be turned upward for convenience in introducing the work.

Each attachment is provided with a corresponding arm, C, and the right-angular or lateral projection D, corresponding to the recess in the presser-foot, so that different attachments are made interchangeable in the same foot.

I claim—

An attachment for sewing-machines, provided with the arm C, extending rearward therefrom, said arm terminating in a right-angular cylindrical projection, D, in combination with the presser-foot, having a transverse opening corresponding to the said cylindrical projection D, and the said opening provided with a lug, $b$, and the projection D having a corresponding notch, $a$, substantially as described.

JOSEPH P. LAVIGNE.

Witnesses:
JOHN E. EARLE,
SAML. HALLIWELL.